(12) United States Patent
Hassan et al.

(10) Patent No.: US 6,994,297 B1
(45) Date of Patent: Feb. 7, 2006

(54) METHOD AND APPARATUS FOR CONTROLLING A VEHICLE

(75) Inventors: Ahmed A. Hassan, Mesa, AZ (US); Garry Billman, Troy, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/974,614

(22) Filed: Oct. 27, 2004

(51) Int. Cl.
    *B64C 21/08* (2006.01)
(52) U.S. Cl. ...................................... 244/204; 244/207
(58) Field of Classification Search ............. 244/75 R, 244/204–209, 90 R, 203, 1 N
    See application file for complete search history.

(56) References Cited

U.S. PATENT DOCUMENTS

| | | | | |
|---|---|---|---|---|
| 2,783,008 A | * | 2/1957 | Bodine, Jr. | .................. 244/130 |
| 3,261,576 A | * | 7/1966 | Valyi | .......................... 244/130 |
| 4,522,360 A | * | 6/1985 | Barnwell et al. | ........... 244/204 |
| 4,813,631 A | * | 3/1989 | Gratzer | ..................... 244/35 R |
| 5,335,885 A | * | 8/1994 | Bohning | ..................... 244/204 |
| 5,813,625 A | | 9/1998 | Hassan et al. | |
| 5,938,404 A | | 8/1999 | Domzalski et al. | |
| 6,092,990 A | | 7/2000 | Hassan et al. | |
| 6,234,751 B1 | | 5/2001 | Hassan et al. | |
| 6,471,477 B2 | | 10/2002 | Hassan et al. | |
| 6,543,719 B1 | | 4/2003 | Hassan et al. | |
| 6,651,935 B2 | * | 11/2003 | Loth et al. | ................... 244/198 |

OTHER PUBLICATIONS

Doerffer et al., "Shock Wave—Boundary Layer Interaction Control by Streamwise Vortices," Department of Transonic Flow and Numerical Methods, Gdansk, Poland, 2004, 2 pages.

* cited by examiner

*Primary Examiner*—Galen Barefoot
(74) *Attorney, Agent, or Firm*—Sonnenschein Nath & Rosenthal LLP

(57) ABSTRACT

A method of controlling movement of a vehicle including generating a fluid jet adjacent an aerodynamic surface of the vehicle, and changing at least one of a strength and a position of a shock wave traveling over the aerodynamic surface of the vehicle by directing the jet into a boundary layer flow of air attached to the aerodynamic surface.

20 Claims, 5 Drawing Sheets

CONTROLLED (Mjet=0.05), CL=0.0333, Cm=0.0070

BASELINE (Mjet=0.0), CL=0.0, Cm=0.0

CONTROLLED (Mjet=0.025), CL=0.0125, Cm=0.0038

CONTROLLED (Mjet=0.05), CL=0.0333, Cm=0.0070

CONTROLLED (Mjet=0.075), CL=0.0501, Cm=0.0077

AIRFOIL LIFT COEFFICIENT

METHOD AND APPARATUS FOR CONTROLLING A VEHICLE

BACKGROUND OF THE INVENTION

The present invention relates generally to vehicles, and more specifically to a method and apparatus for controlling movement of a vehicle.

Conventional aircraft typically have hinged control surfaces (e.g., wing ailerons) to control movement of the aircraft during flight. Specifically, hinged control surfaces can be selectively rotated about a hinge to alter the aerodynamics of an aerodynamic surface of the aircraft (e.g., a wing) and thereby change the attitude of the aircraft. However, because of their rotation about the hinge, such control surfaces typically cause surface discontinuities at the hinge. Surface discontinuities on aerodynamic surfaces of the aircraft such as a wing can cause a degradation in the aerodynamic properties of the control surface and the wing as a whole. Moreover, hydraulic or pneumatic actuators and associated plumbing are frequently used to drive rotation of the control surfaces about the hinge, thereby increasing the complexity, weight, and cost of the control systems.

SUMMARY OF THE INVENTION

In one aspect, a method is provided for controlling movement of a vehicle. The method includes generating a fluid jet adjacent an aerodynamic surface of the vehicle, and changing at least one of a strength and a position of a shock wave traveling over the aerodynamic surface of the vehicle by directing the jet into a boundary layer flow of air attached to the aerodynamic surface.

In another aspect, the present invention includes an airframe including a body and a skin covering at least a portion of the body forming an aerodynamic surface of the airframe. The aerodynamic surface having an opening therein. A jet actuator is mounted on the airframe for generating a fluid jet. The jet actuator is positioned with respect to the opening to direct the jet through the opening into a boundary layer flow of air attached to a portion of the aerodynamic surface adjacent the opening. The jet actuator is also positioned with respect to the opening to direct the jet into the boundary layer in a direction generally normal to the portion of the aerodynamic surface adjacent the opening.

In yet another aspect, a method is provided for controlling movement of a vehicle. The method includes generating a fluid jet adjacent an aerodynamic surface of the vehicle, and changing a pressure exerted on the aerodynamic surface of the vehicle by directing the jet into a boundary layer flow of air attached to the aerodynamic surface in a direction generally normal to the aerodynamic surface.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
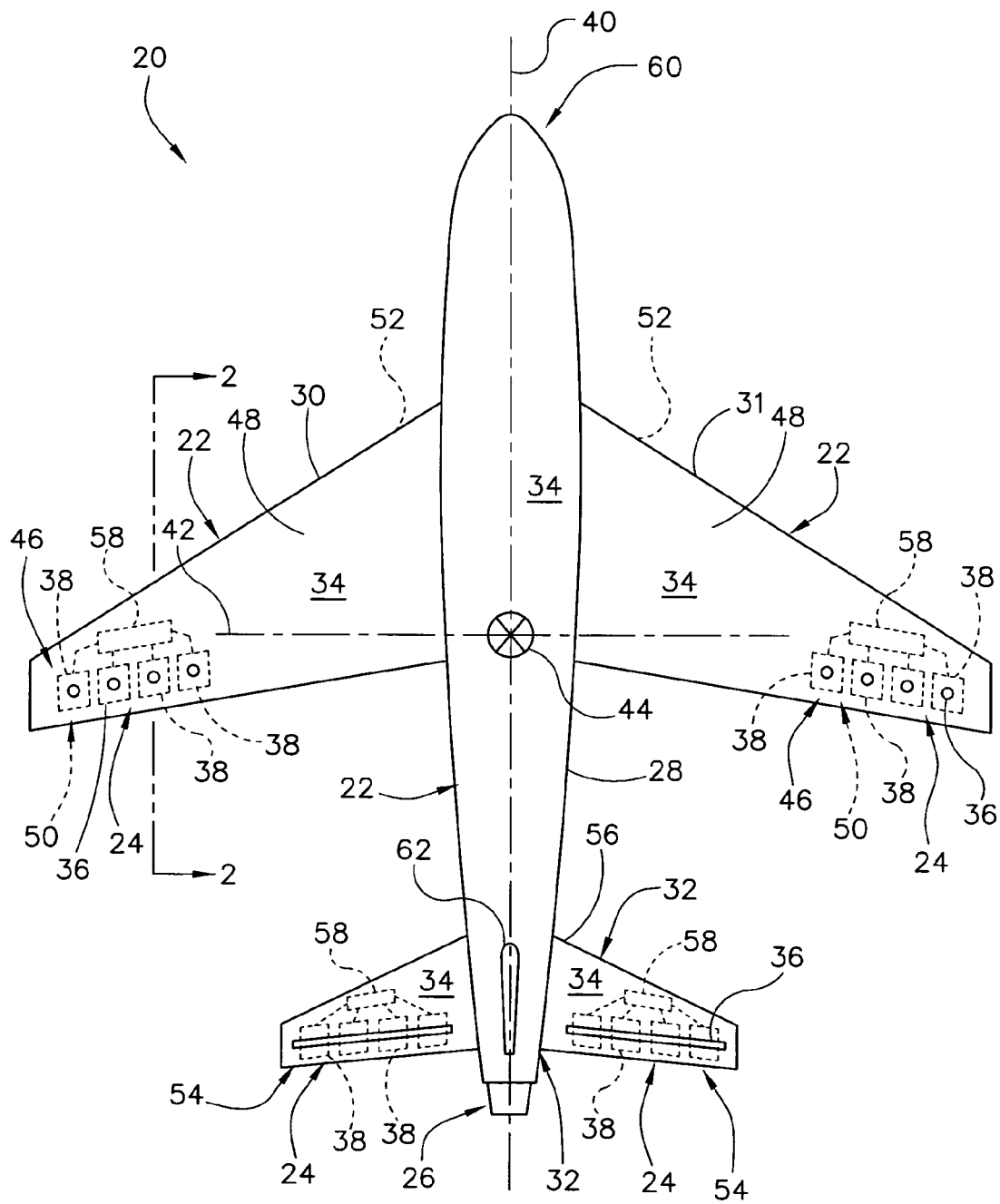
FIG. 1 is a top plan of an aircraft having one embodiment of a control system of the present invention.

Referring now to the drawings, and more specifically to FIG. 1, an aircraft is designated in its entirety by the reference numeral 20. The aircraft 20 includes an airframe (generally designated by 22), a control system (generally designated by 24) mounted on the airframe for controlling movement of the aircraft, and an engine (generally designated by 26) mounted on the airframe for propelling the aircraft. The airframe 22 includes a fuselage section 28, a pair of wings 30, 31 extending laterally outward from the fuselage, and a tail assembly (generally designated 32) extending from a rearward end of the fuselage. The fuselage 28, the wings 30, 31 and the tail assembly 32 are covered in a skin forming an aerodynamic surface 34 of the aircraft 20. The aerodynamic surface 34 includes at least one opening 36 therein for controlling the aircraft, as described below.

Figure 2:
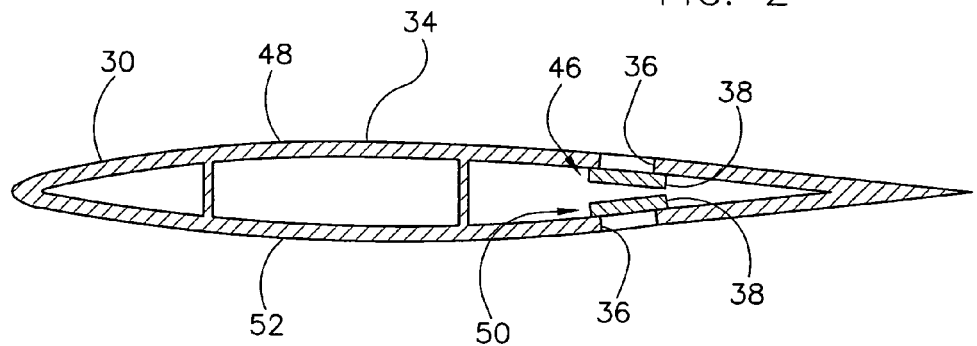
FIG. 2 is a cross section of a wing of the aircraft taken along line 2—2 of FIG. 1.

As shown in FIGS. 1 and 2, the control system 24 includes at least one jet actuator 38 mounted on the airframe for generating a fluid jet. Briefly, the jet actuator 38 is positioned with respect to the opening 36 to direct a fluid jet through the opening into a boundary layer flow of air attached to the aerodynamic surface 34 adjacent the opening during flight of the aircraft 20 (FIG. 1). As is described in more detail below, for transonic and supersonic flight conditions the control system 24 can change a strength and/or a position of a shock wave traveling over the portion of the aerodynamic surface 34 adjacent the opening 36 by directing a jet into the boundary layer flow adjacent the opening. The change in the strength and/or position of the shock wave causes a corresponding change to an aerodynamic property (e.g., lift and/or drag) of the portion of the aerodynamic surface 34 adjacent the opening 36. For subsonic flight conditions, the control system 24 can use the jet to change pressure exerted on the portion of the aerodynamic surface 34 adjacent the opening 36, thereby changing an aerodynamic property of the portion of the aerodynamic surface adjacent the opening. By selectively changing aerodynamic properties of portions of the aerodynamic surface 34 (e.g., a wing surface or a tail assembly surface), the control system 24 can control movement of the aircraft 20 during flight. For example, the control system 24 can control an attitude of the aircraft 20 (e.g., movement about a roll axis 40, a pitch axis 42, and/or a yaw axis 44, shown in FIG. 1), as well as control drag and/or compensate for a change in weight distribution of the aircraft 20 during flight.

The control system 24 may include any number of jet actuators 38 without departing from the scope of the present invention. Moreover, the jet actuator(s) 38 may be mounted anywhere on the airframe 22 to change an aerodynamic property of any portion of the aerodynamic surface 34 without departing from the scope of the present invention. For example, in one embodiment shown in FIGS. 1 and 2 the control system 24 includes an array 46 of a plurality of jet actuators 38 on an upper side 48 of each wing 30, 31 and an array 50 of a plurality of jet actuators on a lower side 52 of each wing for controlling movement about the roll axis 40 and/or the pitch axis 42. Another example is shown in FIG. 1, in which one embodiment of the control system 24 includes an array 54 of a plurality of jet actuators 38 on a horizontal stabilizer 56 of the tail assembly 32 for controlling movement about the pitch axis 42.

The arrays 46, 50, 54 may be arranged in any suitable configuration on the airframe 22 without departing from the scope of the present invention. For example, although other alignments (e.g., v-shaped, staggered, etc.) between individual actuators of each array of actuators may be used without departing from the scope of the present invention, as shown in FIG. 1 each actuator 38 of each array 46, 50, 54 is aligned in a straight line on the airframe 22. Moreover, a particular portion (e.g., a wing) of the aerodynamic surface 34 may include any number of arrays of jet actuators arranged in any suitable configuration with respect to other arrays of jet actuators without departing from the scope of the present invention.

The aerodynamic surface 34 may include any number of openings 36 without departing from the scope of the present invention. In one embodiment in which the aerodynamic surface 34 includes a plurality of openings 36 and the control system includes a plurality of jet actuators 38, each jet actuator of the plurality of actuators is positioned with respect to the openings to direct a jet through a different opening. For example, as shown in FIG. 1 the array 46 of jet actuators 38 on the upper side 48 of each wing 30, 31 includes a plurality of jet actuators each directing a jet through a different opening 36. In another embodiment, at least two jet actuators 38 are positioned to direct a jet through the same opening 36. For example, as shown in FIG. 1 the array 54 of jet actuators 38 on the horizontal stabilizer 56 of the tail assembly 32 includes a plurality of jet actuators 38 each directing a jet through the same opening 36.

Although the openings 36 may have other shapes (e.g., generally quadrilateral) without departing from the scope of the present invention, in one embodiment the openings are generally round (e.g., circular, oval, race-track shaped, and the like). Additionally, different openings 36 may have different shapes from other openings without departing from the scope of the present invention. Although specific shapes have been described and illustrated herein, any suitable shape for the openings 36 is envisioned within the scope of the present invention.

Although the jet actuator(s) 38 may be mounted on the airframe 22 in any suitable fashion so the actuator(s) is positioned with respect to the opening 36 to direct a jet into a boundary layer flow of air adjacent the opening without departing from the scope of the present invention, in one embodiment the jet actuator(s) 38 is mounted on the airframe as shown in FIG. 2. Specifically, a jet actuator 38 is mounted within a wing 30 of the airframe 22 and positioned to direct a fluid jet through an opening 36 in the upper side 48 of the wing. Additionally, another jet actuator 38 is mounted within the wing 30 and positioned to direct a jet through an opening in the lower side 52 of the wing. Each jet actuator 38 may be positioned and/or adaptable to direct a jet into the boundary layer flow in a direction generally normal to and/or a direction generally oblique to the portion of the aerodynamic surface adjacent the opening.

Although other jet actuators may be used without departing from the scope of the present invention, in one embodiment the jet actuator(s) 38 is an oscillatory jet actuator. For example, in one embodiment the jet actuator(s) 38 is selected from the oscillatory air jet actuators described in U.S. Pat. Nos. 5,813,625; 5,938,404; and 6,471,477, which are herein incorporated by reference in their entirety. In one embodiment, the jet actuator(s) is an electromagnetic oscillatory jet actuator. Moreover, the jet actuator(s) 38 may be autonomous without departing from the scope of the present invention so they do not require a fluid supply and associated plumbing. For example, in one embodiment the jet actuator(s) 38 draws in ambient air adjacent the actuator for direction through the opening 36. In an alternative embodiment, each jet actuator 38 is fluidly connected to a fluid supply. When the control system 24 includes a plurality of jet actuators 38, more than one type of actuator may be used without departing from the scope of the present invention. Although it is envisioned that a jet of any suitable fluid (e.g., a gas heated by combustion or a liquid) may be generated by the actuator 38 without departing from the scope of the present invention, in one embodiment the jet actuator generates a jet of air.

The control system 24 is operable to control movement of the aircraft. Specifically, the control system 24 changes aerodynamic properties of the aerodynamic surface 34 by directing fluid jets through the openings 38 and into boundary layer flow attached to the aerodynamic surface 34. By selectively changing aerodynamic properties of portions of the surface 34, the control system can control an attitude of the aircraft, as well as, control the lift/drag of portions of the aerodynamic surface 34. Although the control system 24 may control movement of the aircraft 20 about any axes (including controlling moments about such axes) without departing from the scope of the present invention, in one embodiment the control system controls movement about the roll axis 40, the pitch axis 42, and the yaw axis 44 shown in FIG. 1 to control an attitude of the aircraft 20.

For transonic and supersonic flight conditions, the control system 24 selectively changes aerodynamic properties of portions of the aerodynamic surface 34 by changing a strength and/or a position of shock waves (e.g., the shock wave 57 or the shock wave 59 shown in FIGS. 3A–D) traveling over the aerodynamic surface 34. Specifically, directing jets into the boundary layer flow effectively creates a change in curvature to the aerodynamic surface 34 due to a "virtual" surface bump, and thereby changes a strength and/or position of a shock wave traveling over the "virtual" surface bump. The jets may be directed into the boundary layer flow in any suitable position with respect to a shock wave to achieve a predetermined change in an aerodynamic property of the surface 34. Although other positions with respect to a shock wave may be used without departing from the scope of the present invention, in one embodiment a jet is directed into the boundary layer flow upstream from a shock wave and/or downstream from a shock wave. The fluid jets may be directed into the boundary layer flow in any suitable direction with respect to the aerodynamic surface without departing from the scope of the present invention. In one embodiment, a jet is directed through an opening 36 and into the boundary layer flow in a direction generally normal to a portion of the aerodynamic surface 34 adjacent the opening. In another embodiment, a jet is directed through an opening 36 and into the boundary layer flow in a direction generally oblique to a portion of the aerodynamic surface 34 adjacent the opening. For transonic and supersonic flight, directing the jets into the boundary layer of flow in a direction generally normal to the surface 34 may more effectively create a "virtual" surface bump, and therefore may more effectively change the position and/or strength of a shock wave. Accordingly, for transonic and supersonic flight speeds, directing the jets into the boundary layer flow in a direction generally normal to the aerodynamic surface may be more effective to control the aircraft 20 than a generally oblique direction.

In addition to the angle of the jet and the position of the jet with respect to a shock wave, the timing of when each jet actuator 38 directs a jet into the boundary layer flow can be controlled to achieve a predetermined change in an aerodynamic property of the surface 34 without departing from the scope of the present invention. For example, different actuators 38 within the same array and/or different arrays of actuators may direct fluid jets into the boundary layer at different times to achieve a predetermined change in an aerodynamic property of the surface 34. As shown in FIG. 1, in one embodiment the control system 24 includes a plurality of processors 58 operatively connected to the jet actuators 38 to control the angle, position with respect to a shock wave, and/or timing of each jet. Although a plurality of processors 58 are shown in FIG. 1, any number of processors 58 (including only one) may be used to control the jet actuators 38 without departing from the scope of the present invention. Moreover, each processor 58 may control only one or a plurality of jet actuators 38 without departing from the scope of the present invention.

As shown in FIG. 1, the control system 24 includes the array 46 of actuators 38 on the upper side 48 of each wing 30, 31 and the array 50 of actuators on the lower side 52 of each wing for controlling movement of the aircraft 20 about the roll axis 40. A lift imbalance between the wings 30, 31 is created when the array 50 of jet actuators on the lower side 50 of wing 31 direct fluid into the boundary layer flow attached to the lower side of wing 31 and when the array 46 of actuators on the upper side 48 of wing 30 direct fluid into the boundary layer flow attached to the upper side of the wing 30. Specifically, the jets directed by the arrays 46, 50 cause a shock wave traveling over the lower side 52 of the wing 31 to be closer to a forward end (generally designated by 60) of the aircraft 20 than a shock wave traveling over the upper side 48 of the wing 30. Thus, lift on the wing 31 is decreased and lift on the wing 30 is increased causing the aircraft to move about the roll axis 40 in a clockwise direction.

As should be understood by one skilled in the art, similar use of jet actuators 38 on other portions of the aerodynamic surface 34 (e.g., a portion of the tail assembly) can be used to control the movement of the aircraft 20 about the pitch axis 42 and/or the yaw axis 44 (including moments about such axes), in addition to general control over the lift/drag of portions of the aerodynamic surface. For example, the array 54 of jet actuators 38 on the horizontal stabilizer can be used to change the lift/drag on the horizontal stabilizer and thereby control movement of the aircraft 20 about the pitch axis 42. Similarly, an array (not shown) of jet actuators 38, or alternatively only one, on a vertical stabilizer 62 of the tail assembly 32 may be used to control movement of the aircraft 20 about the yaw axis 44. The arrays 46, 50 on the wings 30, 31 can also be used to control movement of the aircraft 20 about the pitch axis 42 (including control over moments about the pitch axis) by changing the position and/or strength of a shock wave(s) traveling over the wings 30, 31 and thereby moving lift created by the wings 30, 31 toward or away from the forward end 60 of the aircraft. For example, as fuel is depleted during flight, a shift in a center of gravity of the aircraft 20 can be compensated for by creating a moment about the pitch axis 42 as described above.

As discussed above, in addition to controlling the attitude of the aircraft, the control system 24 may be used for general control over the lift/drag of portions of the aerodynamic surface. For example, by changing the strength and/or position of a shock wave traveling over a portion of the aerodynamic surface 34 (e.g., the wings 30, 31, the tail assembly 32, or the fuselage 28), the control system 24 can be used to increase the drag over the portion of the surface to, for example, increase a rate of descent.

For subsonic flight conditions, the control system 24 also selectively changes aerodynamic properties of portions of the aerodynamic surface 34. However, as should be understood by one skilled in the art, rather than interacting with a shock wave, during subsonic flight conditions fluid directed by an actuator 38 into the boundary layer flow changes a pressure exerted on a portion of the aerodynamic surface 34 by effectively creating a change in curvature to the aerodynamic surface due to a "virtual" surface bump. Accordingly, by controlling the pressure distribution over various portions of the aerodynamic surface 34 and thereby controlling aerodynamic properties of the surface, the control system 24 can control the attitude of the aircraft 20, as well as generally control the lift/drag of portions of the aerodynamic surface.

A simulation of the changes in lift and moments about a pitch axis (e.g., the pitch axis 42 shown in FIG. 1) is illustrated in FIGS. 3A–D for an exemplary wing 80 in non-lifting conditions (a symmetrical wing at zero angle of attack). Specifically, FIGS. 3A–D depict the predicted Mach number contours from computational fluid dynamic two-dimensional simulations for the wing 82 at a free stream Mach number of 0.80 and a Reynolds number of 5.67 million, wherein:

C=wing chord length (ft);
$M_{jet}$=normalized peak jet velocity (normalized by free stream speed of sound);
$C_L$=lift coefficient (L/Qinf);
Qinf=free stream dynamic pressure (psi); and
$C_m$=pitching moment coefficient (M/Qinf*C).

Figure 3A:
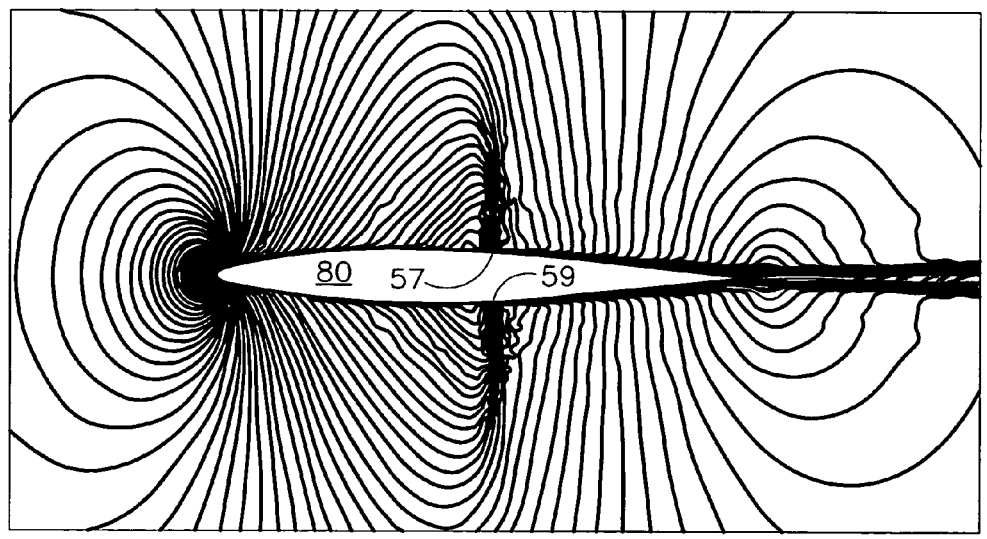
FIGS. 3A–3D are graphs illustrating a simulation of the changes in lift and moments about a pitch axis for an exemplary wing in non-lifting conditions.
Figure 3B:
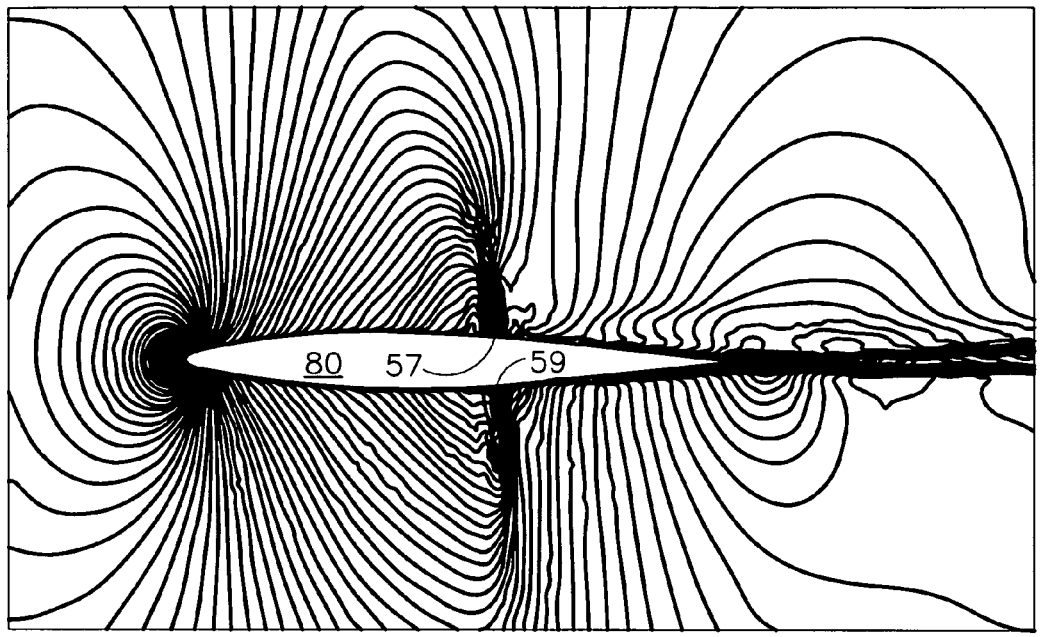
Figure 3C:
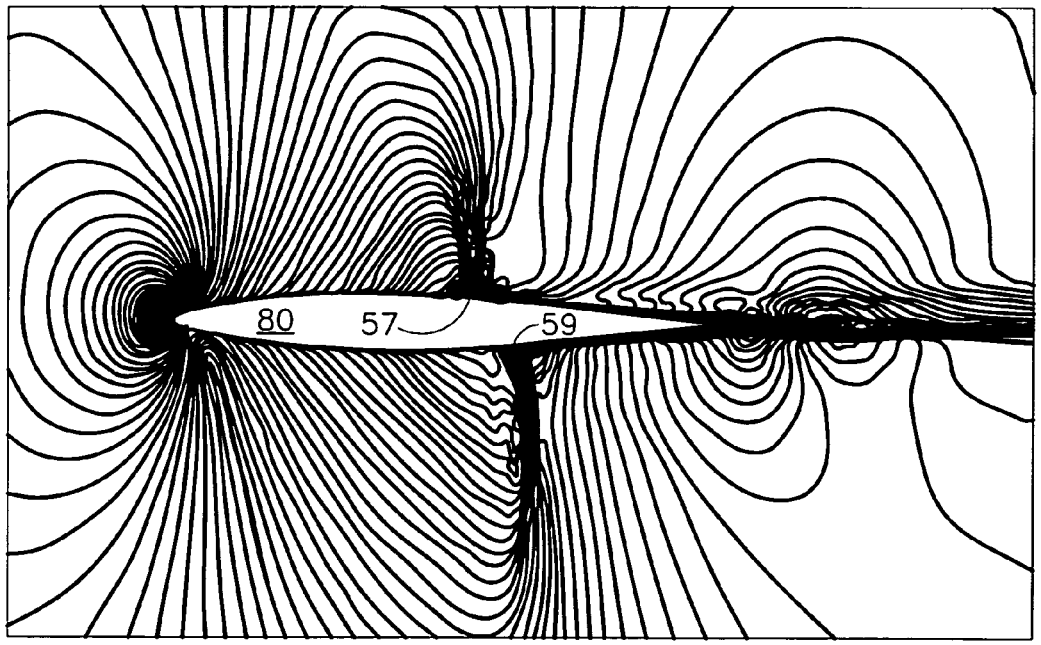
Figure 3D:
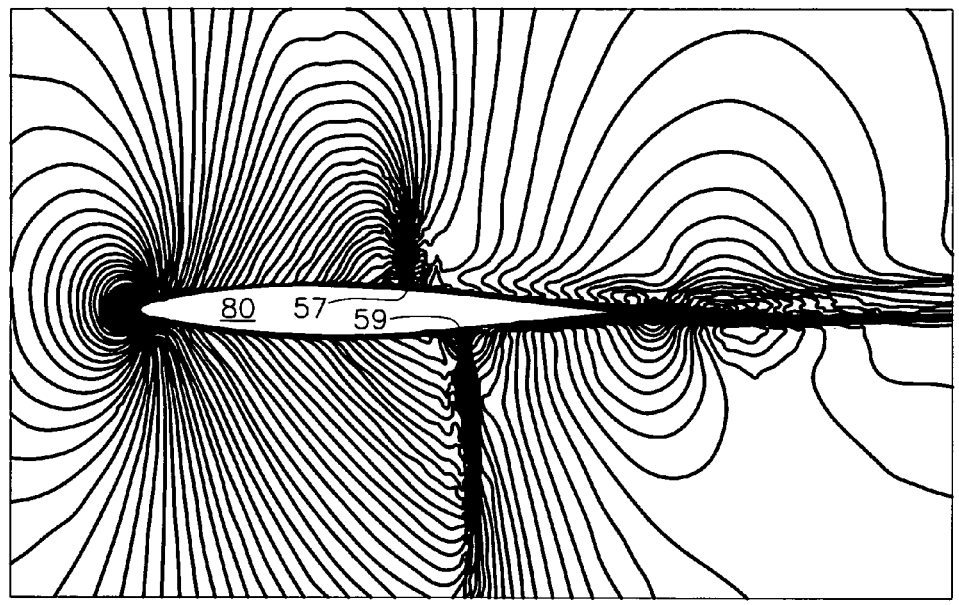

FIG. 3A shows the top and bottom symmetry of the predicted flowfields and shock positions (of the shock waves 57, 59) for $M_{jet}$=0, $C_L$=0, and $C_m$=0, which is expected due to the symmetric wing. FIGS. 3B–D illustrate instantaneous snap shots of the predicted Mach number contours when the jets are introduced into the boundary layer flow at the 0.53 nondimensional chord position (x/C). FIG. 3B illustrates an $M_{jet}$ of 0.025, FIG. 3C illustrates an $M_{jet}$ of 0.05, and FIG. 3D illustrates an $M_{jet}$ of 0.075. The jet excitation frequency, F, was equal to 150 Hz. As can be seen from FIGS. 3A–3D, change of the position of the shock waves was achieved using the present invention, albeit with less change for an $M_{jet}$ of 0.05 than an $M_{jet}$ of 0.075. Additionally, FIGS. 3A–3D illustrate that the present invention may result in an increased "nose-up" pitching moment.

Figure 4A:
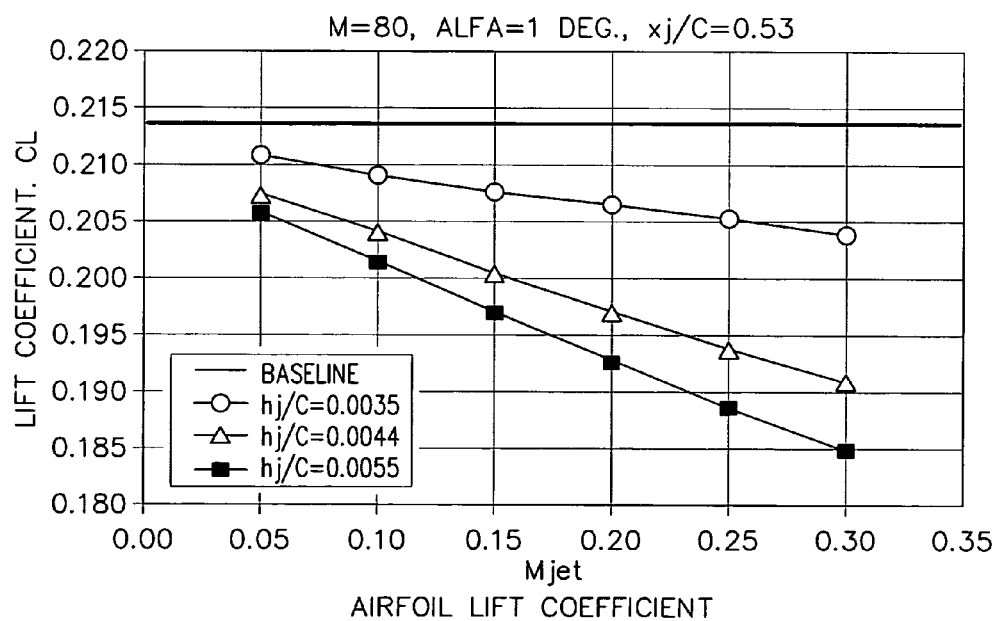
FIGS. 4A–C are graphs illustrating the predicted lift ($C_L$), drag ($C_D$), and pitching moment ($C_M$) coefficients for an exemplary wing in lifting conditions.
Figure 4B:
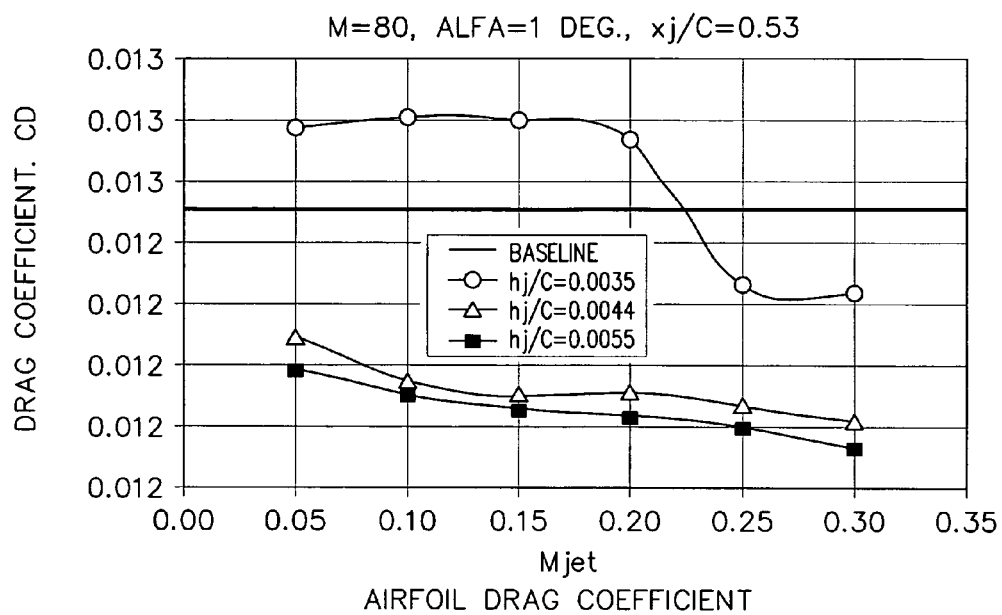
Figure 4C:
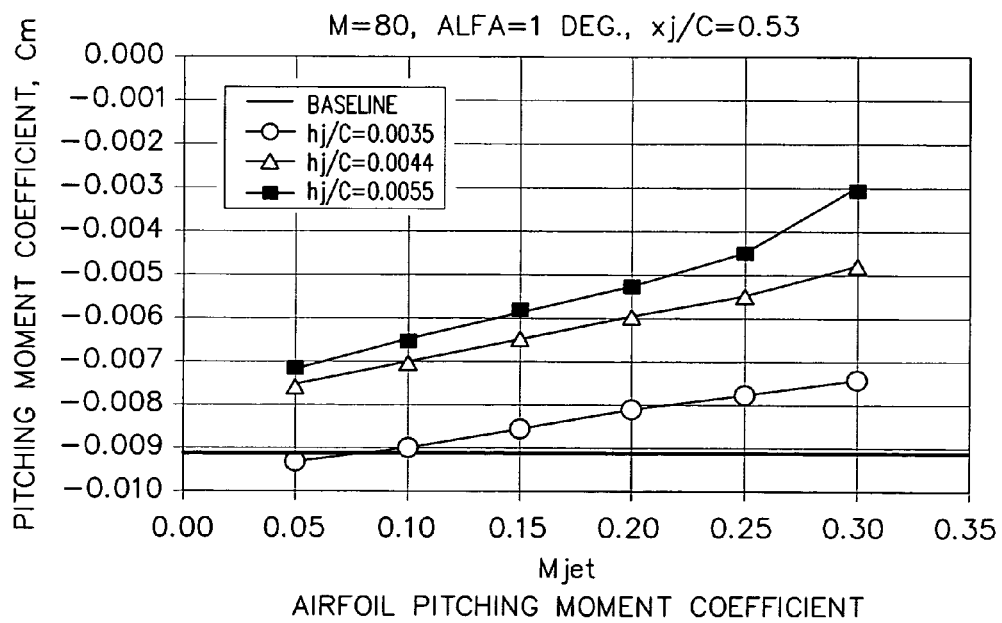

FIGS. 4A–C are graphs illustrating the predicted lift ($C_L$), drag ($C_D$), and pitching moment ($C_M$) coefficients for an exemplary wing in lifting conditions. $C_L$, $C_D$, and $C_M$ are plotted as a function of normalized peak jet velocity (Mjet) and nondimensional width (h/C) of the opening(s) through which the fluid jets are directed, wherein:

C=wing chord length (ft); and
$M_{jet}$=normalized peak jet velocity (normalized by free stream speed of sound).

The above-described control system and method are cost-effective and reliable for controlling movement of a vehicle. Specifically, the control system controls an attitude of the vehicle and/or general lift/drag properties of the vehicle by selectively changing aerodynamic properties of an aerodynamic surface of the vehicle by directing fluid jets into a boundary layer flow attached to the aerodynamic surface. During transonic and supersonic flight conditions, the control system selectively changes a strength and/or a position of shock waves traveling over an aerodynamic surface of the vehicle, and during subsonic flight conditions, the control system controls a pressure distribution over the aerodynamic surface. Because the control system of the present invention may reduce or eliminate the need for hinged control surfaces, it may also decrease surface discontinuities associated with hinged control surfaces. Additionally, the control system of the present invention may reduce or eliminate the need for hydraulic/pneumatic actuators and/or plumbing associated with hinged control surfaces. Moreover, use of autonomous jet actuators may reduce or eliminate the need for a remote supply of fluid and associated plumbing. Accordingly, in view of the above, the control system of the present invention may reduce the complexity, weight, and cost as compared to conventional hinged control systems.

Although the invention is herein described and illustrated in association with an aircraft, it should be understood that the present invention is generally applicable to controlling movement of any vehicle. Accordingly, practice of the present invention is not limited to aircraft, nor is practice of the present invention limited to any specific aircraft described and/or illustrated herein. Moreover, although specific aerodynamic surface shapes and configurations (e.g., wing 30 shown in FIG. 2 and wing 82 shown in FIGS. 3A–D) are described and illustrated herein, it should be understood the present invention is applicable to aerodynamic surfaces of any shape and configuration. Accordingly, practice of the present invention is not limited to the specific shapes and configurations described and/or illustrated herein. For example, practice of the present invention is not limited to symmetrical wings such as those illustrated in FIGS. 2 and 3A–D.

Exemplary embodiments of control systems and methods are described above in detail. The methods and systems are not limited to the specific embodiments described herein, but rather, components of each system may be utilized independently and separately from other components described herein, and steps of each method may be utilized independently and separately from other steps described herein. Each control system component can also be used in combination with other control system components. Additionally, each method step can also be used in combination with other method steps.

When introducing elements of the present invention or the preferred embodiment(s) thereof, the articles "a", "an", "the" and "said" are intended to mean that there are one or more of the elements. The term "plurality" is intended to mean there are two or more of the corresponding elements. The term "multiplicity" is intended to mean that there are three or more of the corresponding elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of controlling movement of a vehicle, said method comprising:
   generating a fluid jet adjacent an aerodynamic surface of the vehicle; and
   changing at least one of a strength and a position of a shock wave traveling over the aerodynamic surface of the vehicle by directing the jet into a boundary layer flow of air attached to the aerodynamic surface downstream from the shock wave.

2. A method in accordance with claim 1 wherein said changing at least one of a strength and a position of a shock wave comprises changing an amount of lift produced by the aerodynamic surface.

3. A method in accordance with claim 1 wherein said changing at least one of a strength and a position of a shock wave comprises changing an amount of drag produced by the aerodynamic surface.

4. A method in accordance with claim 1 further comprising controlling movement of the vehicle about a roll axis by said changing at least one of a strength and a position of a shock wave.

5. A method in accordance with claim 1 further comprising controlling movement of the vehicle about a yaw axis by said changing at least one of a strength and a position of a shock wave.

6. A method in accordance with claim 1 further comprising controlling movement of the vehicle about a pitch axis by said changing at least one of a strength and a position of a shock wave.

7. A method in accordance with claim 1 wherein directing the fluid jet into a boundary layer flow of air attached to the aerodynamic surface comprises directing the jet into the boundary layer flow upstream from the shock wave.

8. A method in accordance with claim 1 wherein directing the fluid jet into a boundary layer flow of air attached to the aerodynamic surface comprises directing the jet in a direction generally normal to the aerodynamic surface.

9. A method in accordance with claim 1 wherein the vehicle is an aircraft having a wing, said changing at least one of a strength and a position of a shock wave traveling over the aerodynamic surface of the vehicle comprising changing at least one of a strength and a position of a shock wave traveling over the wing.

10. A method in accordance with claim 1 wherein the vehicle is an aircraft having a tail assembly, said changing at least one of a strength and a position of a shock wave traveling over the aerodynamic surface of the vehicle comprising changing at least one of a strength and a position of a shock wave traveling over the tail assembly.

11. A method in accordance with claim 1 further comprising compensating for a shift in a center of gravity of the vehicle during operation of the vehicle by said changing at least one of a strength and a position of a shock wave.

12. A method in accordance with claim 1 wherein said changing at least one of a strength and a position of a shock wave traveling over the aerodynamic surface of the vehicle comprises changing at least one of a strength and a position of a shock wave when the vehicle is moving at one of a transonic and a supersonic speed.

13. An airframe comprising:
   a body;
   a skin covering at least a portion of the body forming an aerodynamic surface of the airframe, said aerodynamic surface having an opening therein; and
   an electromagnetic oscillatory jet actuator mounted on the airframe for generating a fluid jet, wherein said jet actuator is positioned with respect to the opening to direct the jet through the opening into a boundary layer flow of air attached to a portion of the aerodynamic surface adjacent the opening, and wherein said jet actuator is positioned with respect to the opening to direct the jet into the boundary layer in a direction generally normal to the portion of the aerodynamic surface adjacent the opening.

14. An airframe in accordance with claim 13 wherein said opening comprises a generally round shape.

15. An airframe in accordance with claim 13 wherein said opening comprises a generally quadrilateral shape.

16. An airframe in accordance with claim 13 wherein the jet actuator is mounted within a wing of the airframe and positioned with respect to the wing and the opening to direct the jet through the opening into a boundary layer flow of air attached to a portion of the wing.

17. An airframe in accordance with claim 13 wherein the jet actuator is mounted within a tail assembly of the airframe and positioned with respect to the tail assembly and the opening to direct the jet through the opening into a boundary layer flow of air attached to a portion of the tail assembly.

18. An airframe in accordance with claim 13 wherein said jet actuator is positioned with respect to the opening to direct the jet into the boundary layer in a direction generally oblique to the portion of the aerodynamic surface adjacent the opening.

19. An airframe comprising:

a body;

a skin covering at least a portion of the body forming an aerodynamic surface of the airframe, said aerodynamic surface having a plurality of openings therein; and a plurality of jet actuators mounted on the airframe, each jet actuator of the plurality of jet actuators being positioned with respect to the plurality of openings to direct a jet through a different opening into a boundary layer flow of air attached to a portion of the aerodynamic surface adjacent the respective opening, wherein each jet actuator is positioned with respect to the respective opening to direct the let into the boundary layer in a direction generally normal to the portion of the aerodynamic surface adjacent the opening.

20. An airframe comprising:

a body;

a skin covering at least a portion of the body forming an aerodynamic surface of the airframe, said aerodynamic surface having an opening therein; and a plurality of jet actuators mounted on the airframe for generating a fluid jet, wherein at least two jet actuators of the plurality of jet actuators are positioned to direct a jet through the same opening into a boundary layer flow of air attached to a portion of the aerodynamic surface adjacent the opening, and wherein said jet actuator is positioned with respect to the opening to direct the jet into the boundary layer in a direction generally normal to the portion of the aerodynamic surface adjacent the opening.

* * * * *